Oct. 5, 1926.

G. V. RYLSKY 1,601,884

MUFFLER FOR INTERNAL COMBUSTION ENGINES

Filed Feb. 4, 1925

GREGORY V. RYLSKY
INVENTOR

BY  John P. Nikonow
ATTORNEY

Patented Oct. 5, 1926.

1,601,884

UNITED STATES PATENT OFFICE.

GREGORY V. RYLSKY, OF WILKINSBURG, PENNSYLVANIA.

MUFFLER FOR INTERNAL-COMBUSTION ENGINES.

Application filed February 4, 1925. Serial No. 6,797.

My invention relates to mufflers for the internal combustion engines and has for its object to provide for a simple and efficient muffler which would reduce the sound of the exhaust gases with the least loss of the engine power.

In ordinary mufflers the noise of the exhaust is reduced by providing an enlarged chamber in the path of the exhaust for the gases to become expanded and cooled. Sometimes additional baffle plates are inserted in order to retard the flow of gases. The noise is reduced by producing static pressure in the muffler from the kinetic energy of the sharply pulsating exhaust. The static pressure thereby produced, however, creates a back pressure, reducing the power delivered by the engine. Even with the best designed mufflers the loss of power is quite noticeable, and often runs as high as 10% of the engine power. Therefore, whenever possible, the exhaust is entirely omitted, for instance, on the aeroplane engines, also on the racing cars and boats.

Analysis and experiments show that the sharpest noise is produced at the valves, when the gases under pressure suddenly emerge into the exhaust pipe, creating a sound wave.

In my muffler I separate the wave of gases into two or more separate paths, differing by approximately one half of the wave length, and then bring these two (or more) waves together, thereby creating interference with resultant dying out of the waves and lessening of the noise. No back pressure is produced with this arrangement, so that the loss of power with my muffler is quite insignificant.

My invention is more fully described in the accompanying specification and drawing in which—

Figure 1:
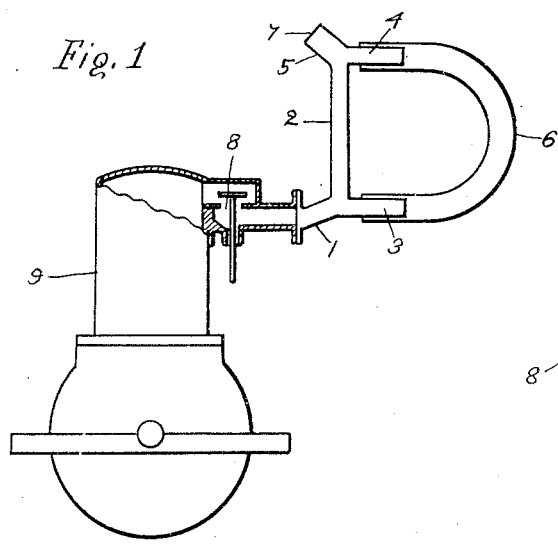
Figure 2:
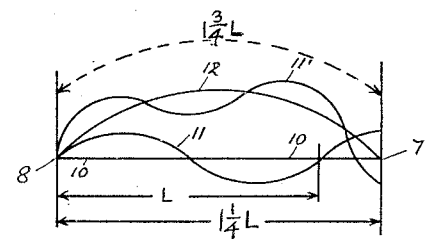
Figure 5:
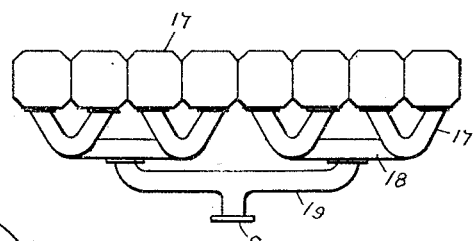
Figure 3:
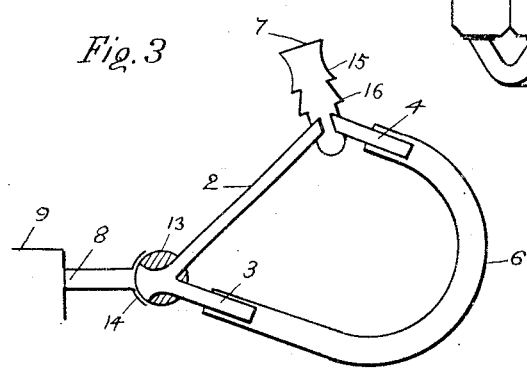
Figure 4:
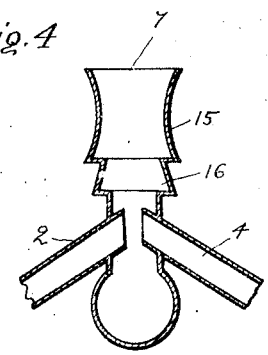

Fig. 1 is an elevation of my muffler in section, Fig. 2 is a diagram of the waves passing through my muffler, Fig. 3 is a modified form of my muffler, Fig. 4 is a detailed view of the interference chamber, and Fig. 5 is a view of a manifold of a multicylinder engine.

My muffler consists of an exhaust pipe 1 divided into two pipes 2 and 3 at an angle with each other. The pipe 2 is again divided into two pipes, 4 and 5, the latter being an exhaust nozzle for the gases to emerge into the atmosphere. A bypass pipe 6 is fitted over short pipes or extensions 3 and 4.

It is important that the relative lengths of the pipes 2 and 6 be proportioned so that the waves of gases, converging in the nozzle 5, should differ by one half of the wave length in order to produce a complete interference. The second pipe 6 is fitted over the short extensions 3 and 4 and can be adjusted in its position by sliding it along these extensions in order to correct the required difference in the wave lengths at the point of exhaust 7.

The operation of my muffler is as follows. The gases from the valve port 8 of an engine 9, flowing through the pipe 1, become divided into two separate streams in the pipes 2 and 3, converging again in the pipe 5 and exhausting through the aperture 7.

A sound wave originates at the valve ports and travels along the pipes, finally issuing from the opening 7. This sound wave, as is well known, consists of alternate compressions and expansions in an elastic medium, which is exhaust gases in present case. Fig. 2 represents this wave diagrammatically along the base line 10—10 representing the length of the exhaust pipes 1, 2 and 5. If the wave has a length "L" and the exhaust pipe has a length of (1¼) L, then the wave 11 will have its maximum amplitude at the exhaust port 7.

Let the curve 12 represent the length of the path for the gases in the pipe 6. Then, if this length is made equal to (1½) L, the same wave 11', traveling through a longer distance in the pipe 6, emerges at the point 7, lagging by one quarter of the wave length behind the wave 11 from the pipe 2. Therefore the amplitude of the wave 11' will be always equal and opposed to the amplitude of the wave 11, the two waves destroying each other through the interference, the compression of one wave being always lost in the vacuum of the other.

It is easy to calculate in each particular case the exact conditions under which the interference will completely destroy the sound waves.

Assume, for instance, that we have an aviation motor with 16 cylinders and running at an average of 1680 revolutions per minute. In this case the number of explosions produced by all 16 cylinders in one second (assuming that it is a four cycle motor) will be as follows:

$$n = \frac{1680 \times 16}{2 \times 60} = 224$$

The sound velocity in the air is 333 meters per second. Accordingly the wave length will be as follows:

$$L = \frac{333}{224} = 1.486, \text{ or about } 1.5 \text{ meters.}$$

We can make the pipe 6 equal to ¾ L and the pipe 2 equal to ¼ L, which will give dimensions 1.125 and 0.375 meters respectively to the lengths of these pipes inside.

This calculation, however, is not exact, as the following factors should be also taken into consideration:

1. The sound velocity in the air, which we assumed to be equal 333 meters per second, is different from its velocity in hot gases, under conditions of variable pressure and speed.

2. The sound waves are also partly dampened on account of the cooling of gases in the exhaust pipes.

3. The relative velocity of gases in the pipes 2 and 6 is also affected by the different resistance of these pipes, their shape, diameters, curves etc.

In practice the effect of these factors may be adjusted experimentally by making the pipes 2 and 6 adjustable in relation to the exhaust pipe 1. Fig. 3 shows such arrangement. Here the exhaust pipes 2 and 6 are joined together in a ball shaped union 13 rotatively clamped (the clamp not shown) in a semicircular socket 14. By turning the pipes in relation to the exhaust pipe 8 it is possible to change the amount of gases passing through the pipes 2 or 6, thereby compensating for any difference in resistance between these pipes. This change is caused by variations in the relative angles of flow. For instance, by turning the ball so as to place the pipe 3 in direct line with the pipe 8, the maximum amount of gas will be directed into the pipe 3 on account of reduced resistance, and a correspondingly reduced amount will flow into the pipe 2 on account of the sharp change of direction of flow.

A further adjustment can be made by sliding the pipe 6 on the pipes 4 and 5, thereby changing the length of the path for the gases flowing through the pipe 6. The pipe 6 may be securely clamped in each position by some ordinary method, for instance, by set screws passing through both pipes (not shown), or by suitable clamps of ordinary construction (not shown).

Any irregularities in the exhaust causing imperfect interference and incomplete muffling of the exhaust, may be compensated by having a special exhaust nozzle 15 with expanded recesses 16 inside. The ends of pipes 2 and 5 may be brought close together to accentuate the effect of interference.

This compensation and all of the above arrangements for producing interference of the sound waves may be quite ineffective in some of the ordinary internal combustion engines, on account of the irregularities, caused by the unequal paths of the exhaust from different cylinders. Such conditions exist, for instance, in multicylinder engines, having a straight manifold with simple branches to each of the cylinders; in which case, of course, it would be impossible to produce correct interference conditions for all of the cylinders.

With my muffler, therefore, it is necessary to have special manifolds with all gas passages equalized. Fig. 5 shows such an arrangement for a multicylinder engine. It is evident that in this case that path from each of the cylinders 9 to the exhaust 20 is the same for all of the cylinders in regard to its length and its resistance.

Important advantages of my muffler are that it produces a perfect dampening of the sound waves without creating any back pressure whatever, thereby not affecting the power delivered by the engine.

I claim as my invention:

In a muffler for internal combustion engines, the combination with an exhaust pipe, an adjustable ball socket at the end of said pipe, two tubes extending from said socket at an angle with each other, one of said tubes being substantially longer than the other, an exhaust nozzle at the end of the longer tube, a short tube extending from said exhaust nozzle substantially parallel with the shorter of the first mentioned tubes, and a curved tube slidably fitted over the ends of said short tubes.

Signed at Wilkinsburg in the county of Allegheny and State of Pennsylvania this 31 day of January A. D. 1925.

GREGORY V. RYLSKY.